(12) United States Patent
Fahldieck

(10) Patent No.: US 8,179,878 B2
(45) Date of Patent: May 15, 2012

(54) METHOD FOR PERFORMING SYNCHRONISATION FOR MULTICAST BROADCAST SERVICES IN A WIRELESS ACCESS COMMUNICATION NETWORK, CORRESPONDING MULTICAST BROADCAST SERVER AND BASE STATION

(75) Inventor: Torsten Fahldieck, Ditzingen (DE)

(73) Assignee: Alcatel Lucent, Paris (FR)

( * ) Notice: Subject to any disclaimer, the term of this patent is extended or adjusted under 35 U.S.C. 154(b) by 899 days.

(21) Appl. No.: 11/845,988

(22) Filed: Aug. 28, 2007

(65) Prior Publication Data
US 2008/0069019 A1 Mar. 20, 2008

(30) Foreign Application Priority Data
Sep. 19, 2006 (EP) .................................... 06300959

(51) Int. Cl.
*H04J 3/06* (2006.01)
*H04H 20/71* (2008.01)
(52) U.S. Cl. ...................................... 370/350; 370/312
(58) Field of Classification Search .................. 370/312, 370/350, 390, 432, 401
See application file for complete search history.

(56) References Cited

U.S. PATENT DOCUMENTS

| 2002/0146063 | A1* | 10/2002 | Gorokhov et al. | 375/148 |
| 2006/0229075 | A1* | 10/2006 | Kim et al. | 455/436 |
| 2006/0239264 | A1* | 10/2006 | Kang et al. | 370/390 |
| 2008/0056219 | A1* | 3/2008 | Venkatachalam | 370/342 |
| 2008/0198785 | A1* | 8/2008 | Huang et al. | 370/312 |

FOREIGN PATENT DOCUMENTS

| EP | 1441480 A2 | 7/2004 |
| WO | WO 95/04420 A2 | 2/1995 |

\* cited by examiner

*Primary Examiner* — Brian Nguyen
(74) *Attorney, Agent, or Firm* — Fay Sharpe LLP

(57) ABSTRACT

The present invention relates to a method for performing data synchronization in a wireless access communication network. The method includes data to be synchronized coming from an access network gateway and being sent to at least two base stations, and the data being further sent from the base stations to user terminals over an air interface in downlink frames. The method also includes sending a signaling message to the at least two base stations with the signaling message having a set of parameters defining unambiguously the position and size of the data in the downlink frame and the structure of the data.

11 Claims, 2 Drawing Sheets

METHOD FOR PERFORMING SYNCHRONISATION FOR MULTICAST BROADCAST SERVICES IN A WIRELESS ACCESS COMMUNICATION NETWORK, CORRESPONDING MULTICAST BROADCAST SERVER AND BASE STATION

The invention is based on a priority application EP 06 300 959.1 which is hereby incorporated by reference.

TECHNICAL FIELD

The present invention relates to method for performing synchronisation for multicast broadcast services in a wireless access communication network.

BACKGROUND OF THE INVENTION

Wireless broadband access communication systems as for example WIMAX systems, foresee the support of multicast/broadcast services as defined in IEEE 802.16e-2005 standard. More precisely, some globally defined service flows may carry broadcast or multicast information that should be delivered to a plurality of end user stations. Since a multicast or broadcast transport connection is associated with a service flow, it is associated with the QoS and traffic parameters for that service flow.

Two types of access to multicast and broadcast services (MBS) may be supported: single base station (Single_BS) access and multi-base station (Mutiple_BS) access. Single-BS access is implemented over multicast and broadcast transport connections within one base station, while multi-BS access is implemented by transmitting data from Service Flow(s) over multiple base stations. A user terminal may support both Single-BS and Multi-BS access. Initiation of MBS with respect to specific user terminals is always performed in registered state by creation of multicast connection carrying MBS data. During such initiation the user terminal learns the Service Flow ID that identifies the service. For multi-BS-MBS, each base station capable of providing MBS belongs to a certain MBS Zone, which is a set of base stations where the same Connection Identifier (CID) is used for transmitting content of certain Service Flow(s). MBS Zone is identified by a unique MBS_ZONE identifier. In multi-BS-MBS all user terminals successfully registered can receive on the cell the MAC PDUs of the multicast and broadcast content that multiple base stations transmit anywhere under the given time period. It requires the multiple base station participating in same Multi-BS-MBS service to be synchronized in the transmissions of common multicast/broadcast data. To ensure proper multicast operation, the CID used for a multi-BS-MBS connection shall be the same for all base stations and user terminals on the same channel that participate in the connection.

Multicast service synchronized across multiple base station enables a user terminal to receive the multicast or broadcast transmission from multiple base station, and thereby improve the reliability of reception using macro diversity.

For this purpose and as already mentioned, MBS transmission in a group of base station should be synchronized. In such case, each base station shall transmit the same PDUs, using the same transmission mechanism (symbol, subchannel, modulation, and etc.) at the same time. The way that multiple base stations accomplish the synchronized transmission (which implies performing functions like classification, fragmentation, scheduling at a centralized point called the MBS Server) is of primary importance for a properly working system.

Indeed, since the transport of broadcast multicast data is IP based, the same packets may be received at very different time at the different base stations from the network side. Consequently, the base station may include the same packet in two different PDUs, generating completely different MBS portions at different base stations and rendering the use of macro diversity impossible at receiver side.

Consequently, a particular object of the present invention is to provide a method for appropriate synchronization for multicast and broadcast services in wireless broadband access networks.

Another object of the present invention is to provide a multicast and broadcast server in accordance with the method.

Another object of the invention is to provide a corresponding base station in accordance with the method.

SUMMARY OF THE INVENTION

These objects, and others that appear below, are achieved by a method, server and base station for performing data synchronisation.

According to the present invention, the structure of the data to be synchronised in the downlink frame should be transmitted to all base stations of a predefined zone by a centralised server. More precisely, the server sends signalling messages comprising parameters guarantying an unified structure of the data to be synchronised for all base stations belonging to the predefined zone.

Parameters of the message address preferably the position and size of the data to be synchronised in the frame, further parameters address the size and position of the bursts inside the data and further parameters address the position and the size of the different PDUs in the bursts.

The method according to the present invention presents the advantage to provide a centralised synchronisation functionality.

Another advantage of the present invention is that there is no need for transporting physical and MAC layer related information as header and additional overhead) to the base stations but only the signaling message on a per frame basis. The physical and MAC layer related information are generated at the base stations and forwarded to the mobile terminals over the wireless interface.

Further advantageous features of the invention are defined in the dependent claims.

BRIEF DESCRIPTION OF THE DRAWINGS

Other characteristics and advantages of the invention will appear on reading the following description of a preferred embodiment given by the way of non-limiting illustrations, and from the accompanying drawings, in which.

DETAILED DESCRIPTION OF PREFERRED EMBODIMENTS

Figure 1:
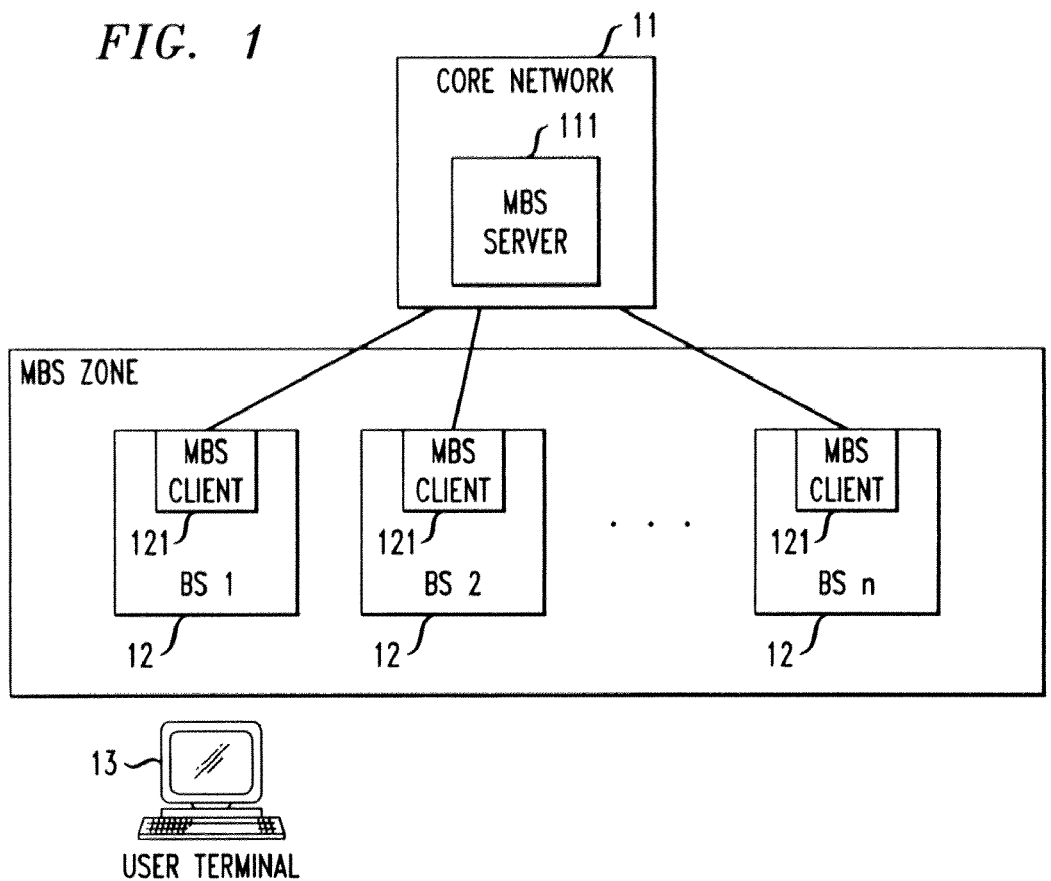
FIG. 1 illustrates an access network gateway in which the present invention may be implemented.

FIG. 1 illustrates an access network in which the present invention may be implemented. The access network comprises an access network gateway 11 and base stations 12 connected either by fixed links or wireless links to access network gateway 11. Access network gateway 11 is connected to the core network while base stations 12 are serving user terminals 13 which are preferably mobile.

In the following description the data to be synchronized are preferably broadcast or multicast data. The description will be may accordingly. It will be clear for a person skilled in the art that the present invention may apply to other types of data to be synchronized.

Access network gateway comprises a Multicast Broadcast Service (MBS) server 111 according to the present invention and base stations 12 comprise a MBS client 121 according to the present invention. It will be clear for the persons skilled in the art that MBS server is a central entity of the access network which may be either collocated to the access network gateway or stand alone or collocated to any other central access network entity.

According to the present invention, MBS server 111 sends messages to MBS clients 121 indicating the structure of each downlink frame to be further sent to user terminal 13 over the air interface. This enables it to send at base stations 12 completely synchronized data over the air interface towards the user terminals enabling them to perform macro diversity when receiving MBS data from different base stations in case MBS-multi base station service is available in the network.

If this were not the case, MBS data which are IP packets would be encapsulated at the base stations 12 without any coordination. Consequently, the contents of the frames sent simultaneously by the different base stations 12 could be different since the schedulers run independently and every scheduler generates a individual downlink frame which differs from the downlink frames of its neighbors. Then, it would impossible for user terminal 13 usually performing macrodiversity to use this feature for MBS services.

To accomplish unified transmission according to the present invention, all base stations 12 in one MBS zone have to generate unique multicast and broadcast portions inside the downlink frames. The MBS portion is a reserved space inside a downlink frame exclusively for MBS connections. For having a synchronized transmission, all base stations in one MBS zone have to be forced to generate a MBS zone wide unique MBS portion. To accomplish this, MBS server 11 sends messages to all base stations 12 in one MBS zone. These messages contain information that gives the base stations the opportunity to generate MBS zone wide unique MBS portions. The messages are transported between MBS server 11 and base stations 12 via the IP protocol.

Then, base stations 12 shortly store the received MBS data and organize them sub sequentially according to the signaled frame structure.

The signaling message is sent from the MBS server which has the knowledge of the MBS data at a centralized point of the access network and which could in advance determine the organization of the frames containing MBS data which will be sent over the wireless air interface.

Figure 2:
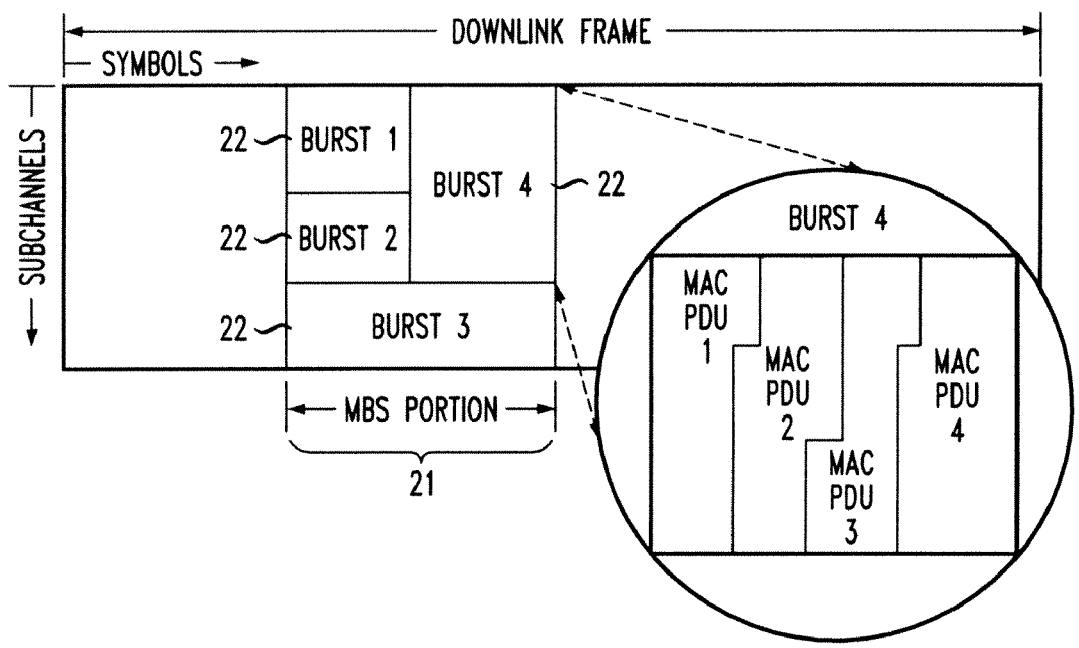
FIG. 2 illustrates a downlink frame structure comprising data to be synchronized according to the present invention.

FIG. 2 illustrates a downlink frame structure according to the present invention.

A downlink frame comprising MBS data comprises a MBS portion 21, which itself comprises several bursts 22, each burst 22 comprises several MAC PDUs.

In order to guaranty a synchronized MBS portion at all base station of a user terminal zone, the message sent by the MBS server to the base stations should comprise an indication on the size and position of the MBS zone in the downlink frame and/or indication on the size and position of the different bursts in the MBS portion and/or a indication on the size and position of the different MAC PDUs in the different bursts.

This signaling message may be sent on a per downlink frame basis. Some parameters of the message as the size and position of the MBS portion may be sent only once at connection establishment if the size and position of the MBS portion is fixed for the duration of the connection. Alternatively if the size and position of the MBS portion is dynamically varying, this information should also be provided on a per frame basis.

In a preferred embodiment of the present invention, the downlink frame has a time and frequency extension as it is the case in OFDMA based wireless access networks as WIMAX.

In such system it may be advantageous that the bursts which can be defined as a part of the downlink frame using the same physical parameters such as modulation and coding schemes, are rectangular in their time/frequency extension. This would have the advantage to reduce the load of the signaling for defining the size and position of the bursts. Consequently, only the parameter as the first symbol of the burst, its time extension and its frequency extension need to be transmitted in the signaling message.

Concerning the MAC PDUs which are the protocol data units of the medium access control layer, they may be preferably arranged in a burst so as to first extend in the time direction and then in the frequency direction. To this extend parameter related to the first symbol of the MAC PDU and its length would be sufficient to unambiguously define its position in the bursts.

It will be clear for a person skilled in the art that any other considerations regarding the arrangement of the bursts and MAC PDUs can be used to reduce the load of the signaling message.

A non exhaustive list of parameters which may be contained in the message is given below:

MBS Portion Symbol Offset which defines the start position of the MBS portion inside the downlink frame in number of OFDMA symbols.

MBS Portion Subchannel Offset which defines the start position of the MBS portion inside the downlink frame in number of OFDMA subchannels.

MBS Portion No of symbols which defines the size of the MBS portion inside the downlink frame in number of OFDMA symbols.

MBS Portion No of subchannels which defines the size of the MBS portion inside the downlink frame in number of OFDMA subchannels.

Burst Attributes defined for each burst.

Burst Symbol Offset which defines the start position of a burst inside the MBS portion of a downlink frame in number of OFDMA symbols. The Burst Symbol Offset is defined relative to the position of the MBS portion.

Burst Subchannel Offset which defines the start position of a burst inside the MBS portion of a downlink frame in number of OFDMA subchannels. The burst subchannel Offset is defined relative to the position of the MBS portion.

Burst No of symbols which defines the size of the burst inside the MBS portion of a downlink frame in number of OFDMA symbols.

Burst No of subchannels which defines the size of the burst inside the MBS portion of a downlink frame in number of OFDMA subchannels.

Coding Scheme which defines the coding scheme of the burst.

MAC PDU Attributes defined for each MAC PDU:
CID which defines the CID of the MAC PDU.
Logical Flow ID which defines the Logical Flow ID of the MAC PDU.
MAC PDU size which defines the size of the MAC PDU in bytes. The order of the MAC PDU's inside a burst is given by the list order.

In a preferred embodiment of the present invention, the MBS server sends out Layout_notify primitives to all base station in the MBS zone on a per frame basis. The Layout_notify primitive is preferably not acknowledged by the base stations which allows the MBS server to broadcast or multicast these primitives. The Layout_notify primitive contains all necessary information for the base station to generate a MBS portion which is unique in the whole MBS zone. For synchronization purposes, the Layout_notify primitive preferably contains a time reference. With this time reference the base station is able to evaluate the appropriate frame in which the MBS portion has to be incorporate. The MBS server is responsible for sending the Layout_notify primitive and the MBS data packet in a manner, that all base stations are able to incorporate the appropriate MAC PDU's in the MBS portions synchronously. The time reference preferably contains the current absolute time in the MBS server plus a static offset. It shall be derived from an absolute time reference. The static offset shall be equal or larger than the longest transport delay between MBS server and base station inside an MBS zone. Based on this time value and its own time reference, base station shall incorporate the MBS portion in the appropriate downlink frame. To incorporate the appropriate upper layer data into the MBS portion, the upper layer packets of MBS data flows shall also be time stamped.

Preferably, If a Layout_notify primitive is not received in time by a base station due to network failure, the base station shall approximate autonomously an MBS portion.

Figure 3:
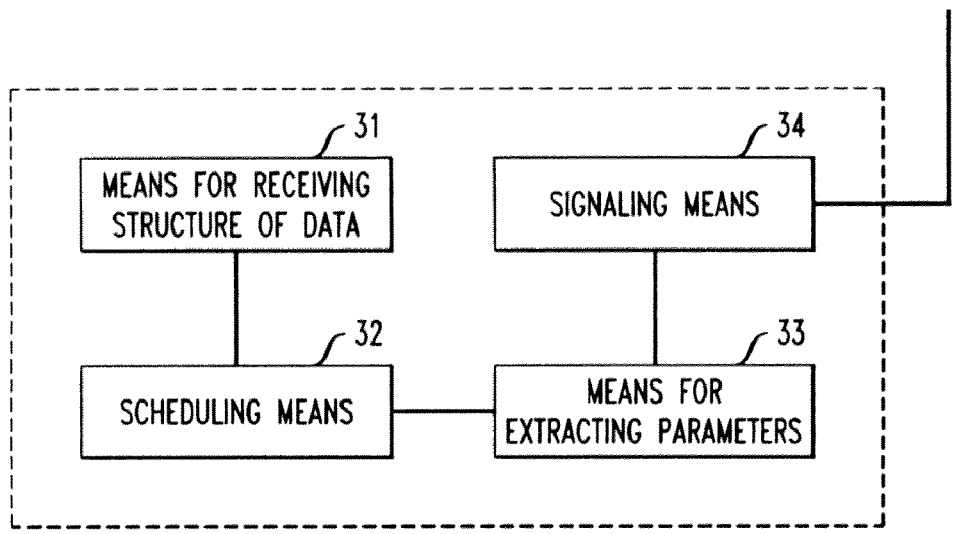
FIG. 3 illustrates a server according to the present invention.

FIG. 3 illustrates a server according to the present invention. A MBS server will be described in the following. The MBS server may be located in the access network gateway or may be a stand alone entity of the wireless access network. The MBS server assigns the necessary connection parameters like Connection ID for the MBS flow and transfer all necessary information to all base stations in the MBS zone to force the base stations to generate unique MBS portions on a per frame basis.

The server comprises means 31 for receiving an indication on the structure of the data to be synchronized as e.g. the size of the different bursts and the structure of the contained MAC PDUs. The server additionally comprises scheduling means 32 for determining an optimized structure of a MBS portion dedicated to comprise the data to be synchronized. Further, the server comprising means 33 for extracting out of said scheduling means 32 the parameters for unambiguously determining the size position and structure of the portion of data to be synchronized. Lastly, the server comprising signaling means 34 for sending said parameters to a plurality of base stations located in a predefined zone. The signalling messages can be sent on a logical connection, which is based on the architecture of the access network.

Figure 4:
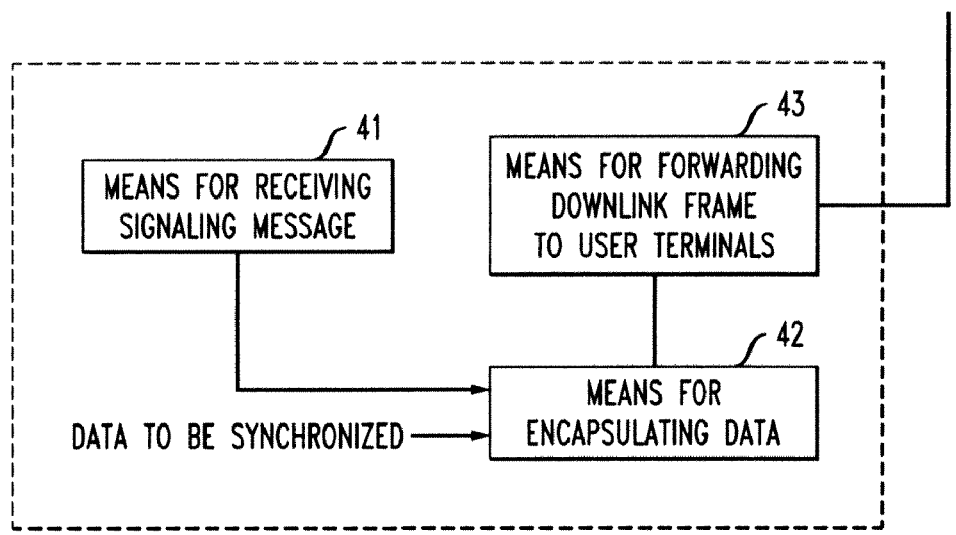
FIG. 4 illustrates a base station according to the present invention.

FIG. 4 illustrates a base station according to the present invention.

The base station comprises means 41 for receiving a signaling message comprising parameters unambiguously identifying the size, position and structure of the MBS portion to be used for building a downlink frame. The base station further comprises means 42 for encapsulating data received from an access network gateway in downlink frames at the position, size and using the structure prescribed in said signalling message. It will be clear for a person skilled in the art that a kind of short time memory should be available to store the received data before they are encapsulated in the downlink frame. Lastly, the base station comprises means 43 for forwarding said downlink frame towards user terminals. This forwarding is preferably a broadcast or multicast transmission.

The invention claimed is:

1. A method for performing data synchronisation in a wireless access communication network, said data to be synchronised coming from an access network gateway and being sent to at least two base stations, said data being further sent from said base stations to user terminals over an air interface in downlink frames, said method comprising the step of sending a signalling message to said at least two base stations from the access network gateway, said signalling message comprising a set of parameters defining unambiguously position and size of said data in said downlink frames and the structure of said data, and sending said data at the position, size and using the structure prescribed in said signalling message from the access network gateway to said at least two base stations.

2. The method according to claim 1, wherein said data are broadcast and multicast data, sent to said at least two base stations belonging to a predefined multicast and broadcast services (MBS) zone, said user terminals receiving said broadcast and multicast data simultaneously from said at least two base stations.

3. The method according to claim 1, wherein said data are comprised in a MBS portion of said downlink frames, said signalling message comprising an indication related to the position and size of said MBS portion in said downlink frames.

4. The method according to claim 3, wherein the structure of said data comprised in said MBS portion comprises indications on the number and/or size and/or position of bursts in said MBS portion.

5. The method according to claim 4, wherein said downlink frame has a time and frequency extension, said bursts having a rectangular extension in said time and frequency.

6. The method according to claim 4, wherein the structure of said data comprised in said MBS portion comprises indications on the number and/or size and/or position of MAC PDUs in said bursts.

7. The method according to claim 1, wherein said signalling message is sent on a per downlink frame basis between said access network gateway and said base stations.

8. A serve for using in a wireless access communication network comprising an access network gateway and at least two base stations, said server comprising means for sending a signalling message to said at least two base stations, said signalling message comprising a set of parameters defining unambiguously position and size of data in a downlink frame sent between said at least two base stations and a user terminal and the structure of said data and means for sending said data in said downlink frame at the position, size and using the structure prescribed in said signalling message to said at least two base stations.

9. The server according to claim 8, wherein the server belongs to an access network gateway.

10. A base station for use in a wireless access communication network, said base station comprising: means for receiving a signalling message comprising a set of parameters defining unambiguously position and size of data in a downlink frame sent between said base station and a user terminal and the structure of said data, means for encapsulating data received from an access network gateway in a downlink frame at the position, size and using the structure prescribed in said signalling message, means for forwarding said downlink frame and said encapsulated data towards user terminals.

11. The base station according to claim 10, wherein said base station is operating in broadcast multicast mode.

* * * * *